(12) United States Patent
Lu

(10) Patent No.: US 6,381,248 B1
(45) Date of Patent: Apr. 30, 2002

(54) NETWORK ARCHITECTURE USES MINI-FIBER NODE AND MINI-COAXIAL NODE TECHNOLOGIES TO PROVIDE BI-DIRECTIONAL BROADBAND COMMUNICATIONS

(75) Inventor: Xiaolin Lu, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/224,222

(22) Filed: Dec. 30, 1998

Related U.S. Application Data

(60) Provisional application No. 60/072,650, filed on Jan. 27, 1998.

(51) Int. Cl.[7] .............................. H04J 3/16; H04L 12/28

(52) U.S. Cl. ...................................... 370/437; 370/431

(58) Field of Search ................................ 370/437, 431; 725/126, 151, 69

(56) References Cited

U.S. PATENT DOCUMENTS

| | | | | |
|---|---|---|---|---|
| 5,073,930 A | * | 12/1991 | Green et al. | ................... 725/69 |
| 5,864,672 A | * | 1/1999 | Bodeep et al. | .............. 725/126 |
| 5,959,658 A | * | 9/1999 | Gnauck et al. | .............. 725/151 |
| 6,195,362 B1 | * | 2/2001 | Darcie et al. | ................ 370/431 |

* cited by examiner

*Primary Examiner*—Le Hien Luu

(57) ABSTRACT

The present invention comprises a method and apparatus for delivering bi-directional broadband communications over an existing network. The present invention is particularly applicable in any existing network whereby multiple primary remote nodes (PRNs) are allocated along a communication path, which partition the communication path into multiple segments. Typically, the overall system bandwidth is defined/limited by the bandwidth of those PRNs, but the communication path itself has a much larger bandwidth. Through the introduction of secondary remote nodes (SRNs), the present invention provides a cost effective mechanism for providing bi-directional broadband communications in any communications network.

39 Claims, 4 Drawing Sheets

NETWORK ARCHITECTURE USES MINI-FIBER NODE AND MINI-COAXIAL NODE TECHNOLOGIES TO PROVIDE BI-DIRECTIONAL BROADBAND COMMUNICATIONS

This application claims the benefit under 35 U.S.C. § 119(e) of U.S. Provisional Application No. 60/072,650, filed Jan. 27, 1998, entitled "Method And Apparatus For Providing Two-Way Broadband Communications.

CROSS-REFERENCE TO RELATED APPLICATION

Related subject matter is disclosed in the following co-pending application assigned to the Same Assignee hereof: U.S. patent application Ser. No. 08/526, 736 entitled "Network Apparatus and Method for Providing Two-Way Broadband Communications," filed Sep. 12, 1995, now abandoned, continuation Ser. No. 08/916, 023 filed Aug. 21, 1997, now U.S. Pat. No. 5,864,672.

FIELD OF THE INVENTION

The present invention relates generally to information network architecture. In particular, the present invention is directed to a method and apparatus to provide two-way broadband communications over any network, especially where the bandwidth of the existing network is limited.

BACKGROUND OF THE INVENTION

With the growth of the Internet and increasing public reliance upon digital information technology, the demand for broadband communications services such as real-time audio and video has increased. Although there have been significant advances in server and router capacity, information theory and coding and compression techniques, the bandwidth capacity of the physical network remains the primary bottleneck for broadband communications.

The existing cable network provides a potential source for delivering bi-directional broadband services. In order to provide two-way broadband services, the cable industry faces the challenge of cost-effectively transforming a traditional uni-directional cable system, which was designed for broadcast services with tree-and-branch architecture, into a two-way broadband digital platform. Cable networks, either pure coaxial networks or modem hybrid fiber/coaxial (HFC) networks, utilize broadband coaxial cable to connect customers to either the remote fiber nodes or the cable headend. Along the coaxial cable, multiple coaxial amplifiers are deployed to overcome the cable loss. Although the passive elements of the cable network, the fiber, coaxial cable itself, taps and couplers, can provide up to 1 GHz of bandwidth, the amplifiers spanning the coaxial cable have inherent bandwidth limitations (typically, 350 MHz, 550 MHz or 750 MHz), which limit the overall bandwidth capacity of the network.

A conventional solution to these bandwidth limitations involves two upgrade components. First, in order to accommodate broadband signals, the existing coaxial amplifiers are replaced with higher bandwidth bi-directional coaxial amplifiers. Second, due to the fact that losses along the coaxial cable are directly proportional to the frequencies at which signals are transmitted along the cable, the spacing between amplifiers is reduced, which requires the deployment of additional amplifiers. The cable industry has followed this conventional upgrade strategy by upgrading the currently deployed 350 MHz or 550 MHz coaxial amplifiers to 750 MHz amplifiers, and enabling bi-directional capability using low-frequency (5–40 MHz) upstream technology.

However, there are major shortcomings to this conventional approach. First, upstream channel performance is limited. Because the cable network was designed to deliver analog television signals, which occupy the frequency range from 50 MHz through the bandwidth of the coaxial amplifiers themselves, upstream communications are limited to the frequency band of 5–40 MHz. Although this upstream bandwidth may be adequate for existing applications such as web browsing, bandwidth intensive applications such as videoconferencing and other multimedia applications are not possible using the conventional upgrade technology. In addition, ingress noise in that frequency range severely limits channel performance and reducing ingress noise necessitates performing complicated signal processing and spectrum management, translating into higher terminal costs.

Second, the conventional cable upgrade approach is expensive and complex, requiring the deployment of additional amplifiers and network re-engineering. As higher frequencies are used, additional amplifiers are necessary to overcome the increased loss associated with these signals. Noise and reliability concerns, on the other hand, demand the use of fewer amplifiers in cascade. Resolution of this conflict requires network re-branching and re-engineering leading not only to more amplifiers; in the field but also a more complicated coax plant. These difficulties translate into higher costs and operational complexities raising serious questions about the adequacy, quality and reliability of the resulting transport capability.

Third, even with higher bandwidth amplifiers (750 MHz) there still exists a large portion of unexploited bandwidth 750 MHz–1 GHz. Thus, the conventional upgrade approach does not efficiently utilize the available bandwidth in the network.

Mini-Fiber Node (mFN) technology, provides a solution to the limitations imposed by the conventional approach by introducing a low-cost converter node or mFN adjacent to each coax amplifier. The mFNs directly couple into passive coax cable and connect to the headend with separate optical fiber. The mFN then utilizes abundant noise-free bandwidth at higher frequencies, available over the passive coax cable and optical fiber for bi-directional communications.

However, depending on the topology and demography of the embedded cable networks, deploying fiber to each distribution coaxial amplifier may be expensive, especially if an amplifier serves only a few users.

Delivering broadband services using the existing cable infrastructure and mFN technology requires a two-fold solution. First, fiber deployment must be controlled in order to reduce costs. Second, the upgrade solution must be transparent such that the path between the mFN and users is passive at the high frequency band, therefore eliminating the complexities of RF amplifications in that path and the associated cost of modifying existing systems.

SUMMARY OF THE INVENTION

The present invention comprises a method and apparatus for delivering bi-directional broadband communications over an existing network. The present invention is applicable in any existing network where multiple primary remote nodes (PRNs) are allocated along a communication path, which partition the communication path into multiple segments. Typically, the overall system bandwidth is limited by the bandwidth of these PRNs, but the communication path itself has a much larger bandwidth.

For example, one embodiment of the present invention provides for the upgrade of a traditional uni-directional HFC network into a bi-directional broadband communications network. According to this embodiment, a converter apparatus is deployed adjacent to certain PRNs and each converter is directly connected with the central office over additional bi-directional paths. Using this topology, each converter provides access to the communication path downstream of its associated PRN. Multiple secondary nodes (SRNs) are then deployed at the remainder of the PRNs downstream from the converter. The SRNs are capable of bypassing bi-directional traffic between the downstream and upstream segments of the communication path segmented by the PRNs, at a frequency band outside or inside the bandwidth of the PRNs. In one embodiment, some of the SRNs directly connect to the converter over a separate path in order to overcome the loss over the communication path.

Through the introduction of the SRNs, the present invention provides a cost effective mechanism for the deployment of separate broadband fiber transmission paths for transmitting bi-directional broadband signals between the converters and the central office and reducing the amount of fiber deployment.

DETAILED DESCRIPTION

The embodiments of the present invention described herein relate to only one possible application of the present invention pertaining to the upgrade of a conventional one-way HFC network to a broadband bi-directional HFC network. However, the present invention is not limited to application in HFC networks alone and the embodiments discussed herein are merely illustrative and not intended to limit the scope of the claims appended hereto. The present invention is applicable in virtually any type of computer communications or broadcast network for the transmission of digital or analog signals.

In general, the present invention may be implemented in any communication network in which a number of primary remote nodes (PRNs) are allocated along a communication path such that the overall system bandwidth is limited by the PRNs' bandwidth, but the communication path has a much larger bandwidth. For example, an HFC network typically contains one or more communication paths, each path partitioned into multiple segments by one or more coaxial amplifiers (PRNs) which limit the overall network bandwidth. However, in a typical HFC network the passive components along the communication path (optical fiber and other passive conduction media) have a bandwidth greatly exceeding the bandwidth of the coaxial amplifiers. Thus, the coaxial amplifiers (PRNs) function as the bandwidth bottleneck in HFC networks.

According to one embodiment of the present invention, in order to overcome the bandwidth limitations of the active coaxial amplifiers and exploit the bi-directional capability, a mFN (converter node) is allocated adjacent to certain coaxial amplifiers or splitting positions. A new type of secondary node, referred to as a Mini-Coaxial Node (mCN) is then deployed at the remainder of the coaxial amplifiers downstream to the mFN. The mCN comprises a diplexer combination such that it can bypass the new high frequency bi-directional traffic around the embedded coaxial amplifier with minimum additional loss to both the existing and new traffic. In another embodiment described herein, the mCN is directly connected to the mFN through a second coaxial cable to overcome the insertion loss over the primary coaxial leg. The positions of the mFNs and mCNs are arranged such that the gain inside each mFN is sufficient to overcome the total loss over the coaxial path introduced by the mCNs and other coaxial components, and to maintain acceptable signal levels for both the end users and at the headend.

Figure 1:
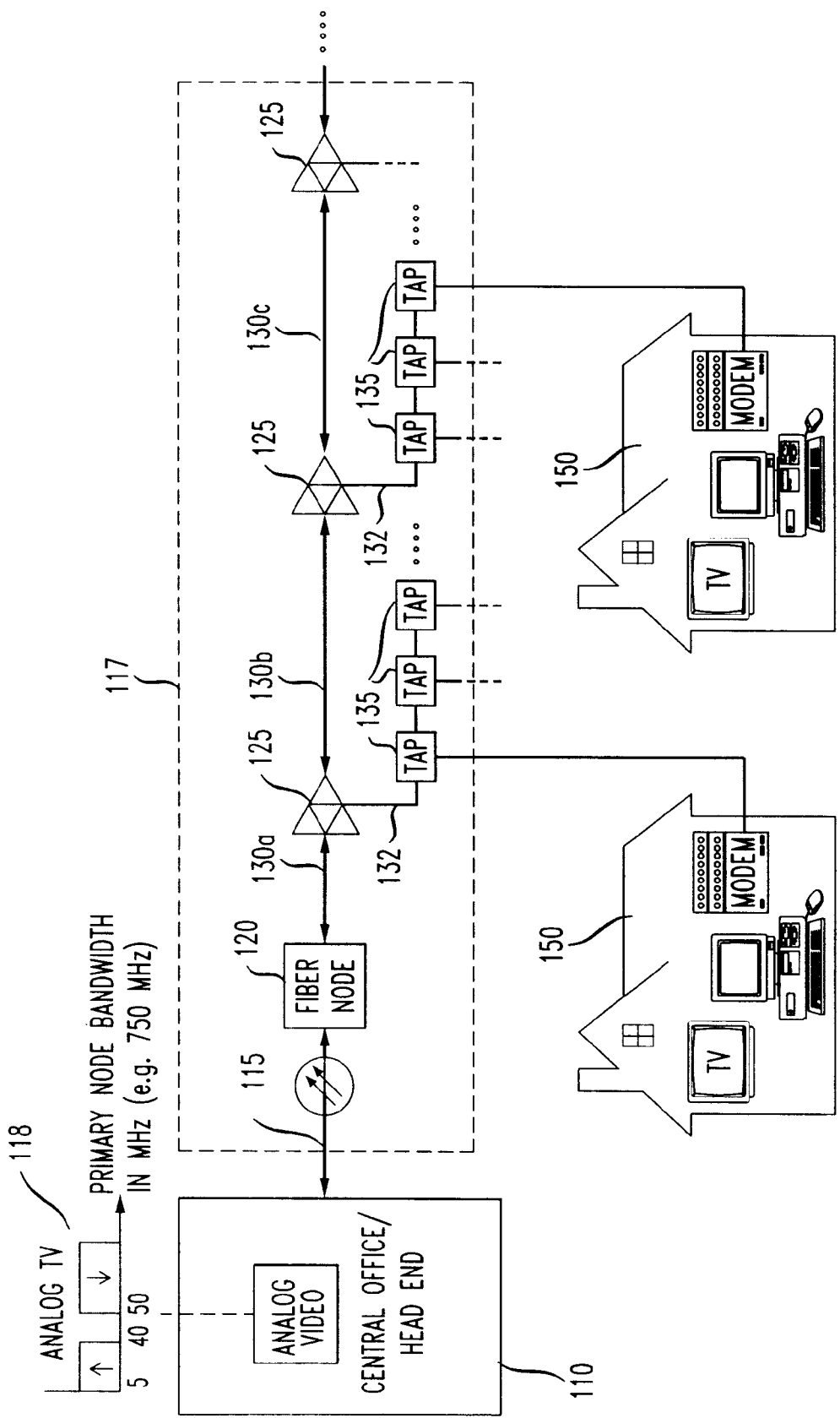
FIG. 1 is prior art, which depicts the architecture of a conventional cable network upgrade for the delivery of bi-directional communications.

FIG. 1 depicts the architecture of a conventional hybrid fiber/coaxial (HFC) cable upgrade for the delivery of two-way communications. This is prior art. Upstream and downstream FDM (frequency division multiplexing) signals traverse communication path 117. Downstream FDM signals are generated at central office/Head end (CO) 110 and transmitted downstream to fiber node 120 via optical fiber 115. Fiber node 120 converts downstream optical signals arriving from CO into electrical signals for transmission along coaxial cable segments 130a, 130b, 130c, etc. Similarly fiber node 120 converts upstream electrical signals from end units 150 arriving over coaxial cable segments 130a, 130b, 130c, etc. into optical signals for transmission in reverse direction to head end 110. Coaxial amplifiers 125 are deployed at pre-selected intervals to offset losses in the coaxial cable and consequently partition the coaxial cable into multiple segments, 130a, 130b and 130c. Coaxial amplifiers 125 provide amplification of both upstream and downstream signals for bi-directional communication and typically, have bandwidth up to 750 MHz. Coaxial distribution legs 132 carry downstream FDM signals to end units 150 via taps 135. In addition, upstream FDM signals generated at end units 150 are transmitted through taps 135 and coaxial distribution legs 132 for transmission to CO 110. There may also be taps allocated along 130a, 130b, 130c, etc. End units 150 may be modems coupled with a tuner or other devices used for the tuning and demodulation of a multiplexed signal consisting of a set of carrier frequencies modulated with information.

Typically, CO 110 delivers FDM analog television signals over communication path 117 depicted in FIG. 1. As depicted in 118, these FDM signals typically occupy the frequency range from 50 MHz through the bandwidth limit of amplifiers 125, (e.g., 750 MHz). Typically, in a conventional cable network upgrade as depicted in FIG. 1, frequencies below 50 MHz (e.g., 5–40 MHz) carry upstream communication signals generated by end units 150 for transmission to CO 110. However, the upstream traffic is subject to ingress noise created by home appliances and in-air RF signals. Note that the bandwidth of the communications network depicted in FIG. 1 is limited primarily by amplifiers 125 with bandwidth up to 750 MHz. The bandwidth of the underlying coaxial cable 130 and other passive components in the communication path is typically in the range of 1 GHz.

Figure 2:
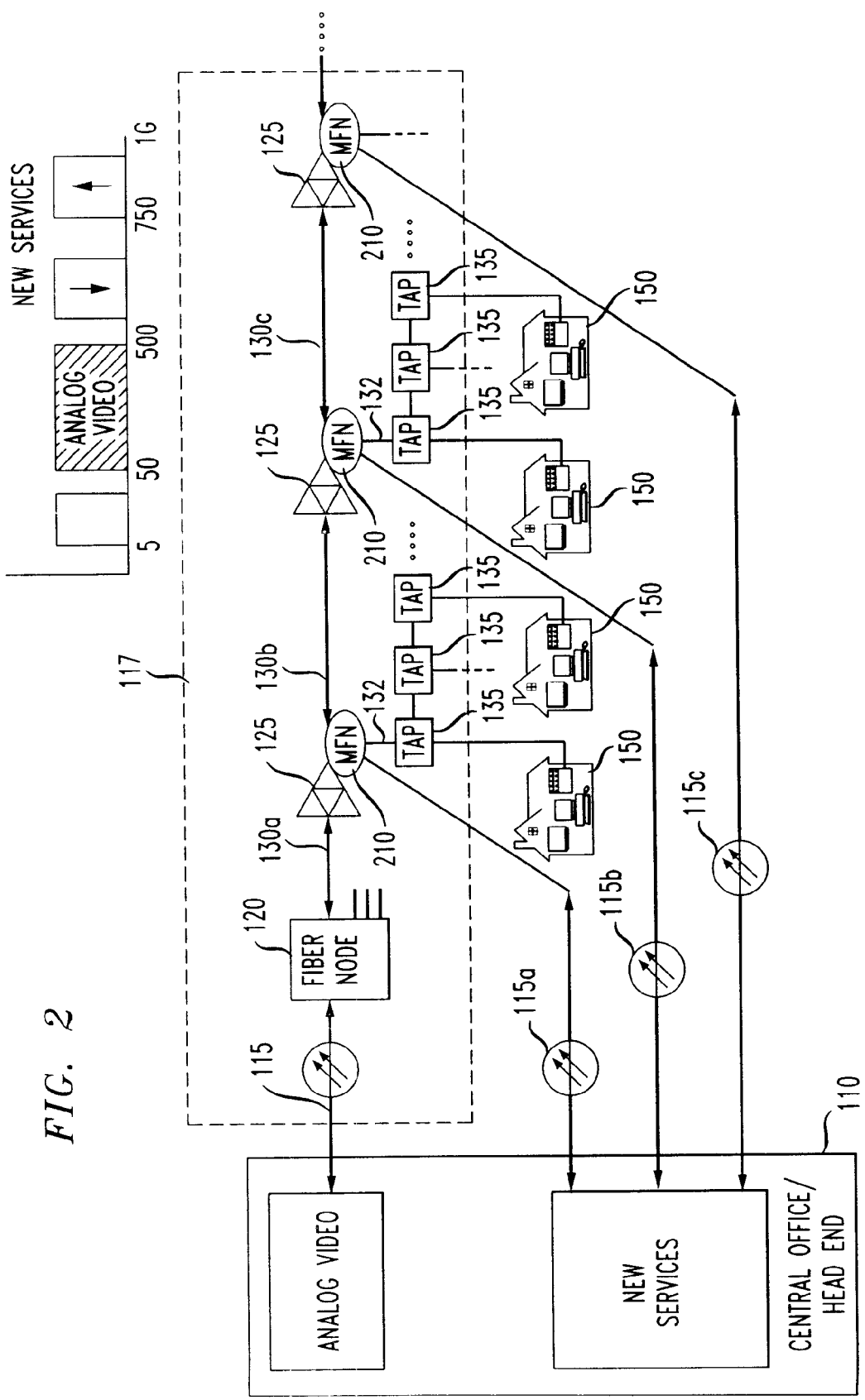
FIG. 2 illustrates a large scale network apparatus for providing two-way broadband communications utilizing mFN technology.

FIG. 2 illustrates one embodiment of a network apparatus for providing two-way broadband communications in accordance with the previously referenced patent application. This technology utilizes the underlying cable infrastructure for delivering traditional broadcast services but also incorporates mini-fiber node (mFN) technology and additional optical fiber to deliver bi-directional broadband communications. Traditional services are delivered over communication path 117, as previously described, by reference to FIG. 1.

MFNs 210, deployed adjacent to coaxial amplifiers 125, are coupled directly to central office 110 over second communication paths through optical fiber 115a–c. New bi-directional broadband services are delivered downstream from central office 110 over separate optical fiber 115a–c directly to mFNs 210, through coaxial distribution legs 132 and taps 135 to end users 150. Similarly, high bandwidth upstream traffic is directed from end users 150 through taps 135 and coaxial distribution legs 132 to MFNs 210, through optical fiber 115 to central office 113.

Solely employing mFN technology to deliver bi-directional broadband services requires the deployment of additional fiber at each coaxial amplifier 125 (primary nodes). Depending upon the topology and demography of the embedded cable networks, however, deploying fiber to each coaxial amplifier may be expensive, especially if that amplifier only serves a few users. The present invention comprises a method and apparatus for providing transparent bi-directional broadband communications, which employs mFN technology, but at a reduced cost through the introduction of an mCN, a secondary node apparatus. The introduction of mCNs reduces the number of required mFNs and fiber deployment while maintaining the transparency of high frequency bandwidth.

Figure 3:
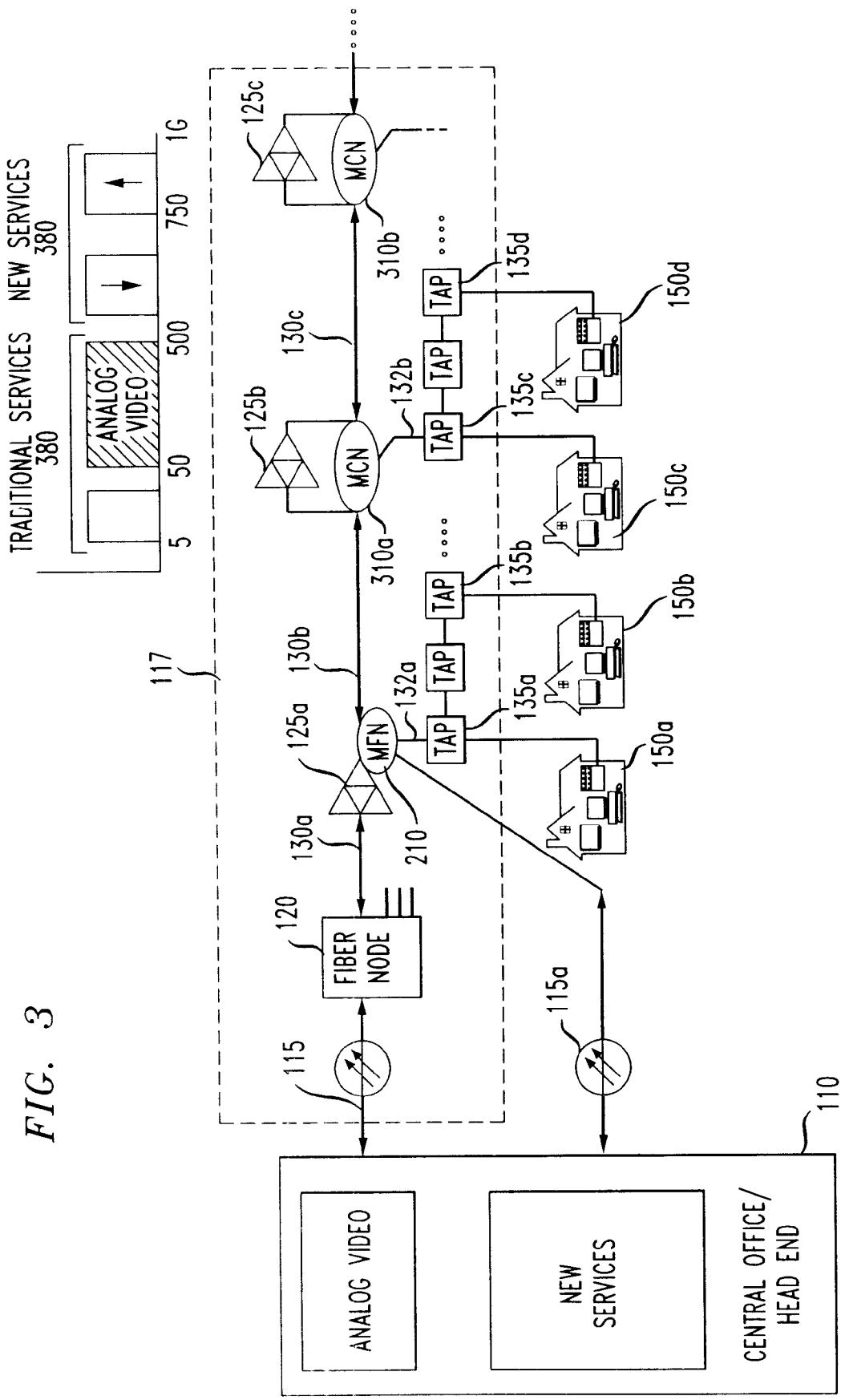
FIG. 3 depicts the architecture of a bi-directional broadband communications network upgrade incorporating mFN and mini-Coaxial Node technology as applied to an HFC network according to one embodiment of the present invention.

FIG. 3 depicts one embodiment of the present invention as applied to upgrade a conventional HFC network to support bi-directional broadband services. The upgrade architecture as depicted in FIG. 3 provides the capability of delivering traditional services 380 utilizing lower frequency signals (e.g., below 500 MHz) as well as new services 390 utilizing higher frequency signals (e.g., from 500 MHz–1 GHz). For example, new services 390 might include upstream and downstream broadband communication signals transmitted between end users 150 and CO 110. With this arrangement, the existing distribution system, FIG. 1, can still operate as before, delivering traditional services 380 over existing communications path 117 using the respective lower frequency band over coaxial cable 130 to distribution legs 132, taps 135 and end units 150.

Employing mFN technology, new services using higher frequency bands are delivered over a second communication path from CO 110 through fiber 115a to mFN 210 and downstream to at least one end unit 150a–d. However, according to one embodiment of the present invention, mFN 210 (converter apparatus) is only deployed adjacent to certain coaxial amplifiers 125a (primary nodes), rather than adjacent to each coaxial amplifier, as required when solely employing mFN technology. Mini-coaxial nodes (mCNs) 310a–b (secondary nodes) are deployed adjacent to the remainder of coaxial amplifiers 125b, 125c downstream of mFN 210. MCNs 310a, 310b comprise a diplexer combination for bypassing high-frequency bi-directional traffic (e.g., new broadband services 390) around embedded coaxial amplifiers, 125b, 125c, with minimum additional loss to both the existing and new traffic. Thus, mCNs 310a, b route high-frequency signals 390 around limited bandwidth coaxial amplifiers, 125b, 125c, while routing lower frequency traffic (e.g., traditional services 380) through coaxial amplifiers 125a–c, ultimately reaching end units 150a–d.

Using the combination of mCN and mFN technology, traditional services 380, such as analog video, utilizing lower frequency carrier signals originate at CO 110 and are transmitted over communication path 117 through optical fiber 115 to fiber node 120. Fiber node 120 converts optical signals to electrical signals and further transmits downstream FDM signals over coaxial cable 130a through coaxial amplifier 125a. Downstream FDM signals carrying traditional services 380 are then transmitted along coaxial-cable 130b to mCN 310a. At mCN 310a, the entirety or a portion of lower frequency FDM signals carrying traditional services 380 are routed through coaxial-amplifier 125b to adjacent segment of coaxial cable 130c. Lower frequency FDM signals 380 are then transmitted to end units 150c–d and possibly to second mCN 310b, where the signals again may be routed through coaxial-amplifier 125c.

According to this same embodiment, higher frequency FDM signals carrying new services 390 originate at CO 10 and are transmitted over a second communication path comprising optical fiber 115a to mFN 210. MFN 210 distributes these higher frequency downstream signals to end users 150 and mCNs 310 over the communication path downstream of itself. Thus, the higher frequency FDM signals are transmitted to end units 150a, 150b through coaxial distribution leg 132a and cable taps 135a–b. Additionally, according to this same embodiment, the higher frequency FDM signals are also routed along coaxial cable segment 130b to mCN 310a. At mCN 310a, a diplexer routes higher-bandwidth FDM signals around coaxial-amplifier (primary node) 125b to adjacent segment of coaxial cable 130c, thus avoiding the bandwidth limitation of coaxial-amplifier 125b. The higher-bandwidth FDM signals are then transmitted to end users 150c, 150d through coaxial distribution leg 132b and cable taps 135c and 135d respectively. In addition, higher-bandwidth FDM signals may be transmitted to additional downstream mCNs (e.g. 310b) along coaxial segment (e.g., 130c). For example, at downstream mCN 310b, the higher frequency FDM signals may again be routed around coaxial amplifier 125c for further transmission downstream.

In the upstream direction, according to one embodiment, end units 150 transmit higher frequency electrical signals through taps 135 and coaxial distribution leg 132 to mCN 310. At mCN 310 the high-frequency upstream traffic is routed around the related coaxial amplifier 125 to an adjacent segment of the coaxial cable (e.g., 130a, b or c). MCN 310 may also route lower frequency upstream signals through the related bi-directional coaxial-amplifier (e.g, 125a, b, c) to upstream adjacent segment of coaxial cable (e.g., 130a, b, c). For example, according to one embodiment of the present invention, upstream traffic generated at end unit 150d is routed through tap 135d to coaxial distribution leg 132b to mCN 310a. MCN 310a routes high-frequency upstream traffic around coaxial amplifier 125b to adjacent segment of coaxial cable 130b while lower frequency signals are routed directly through bi-directional coaxial-amplifier 125b to adjacent segment of coaxial cable 130b. Upstream traffic is then transmitted along coaxial cable segment 130b to mFN 210. High frequency traffic is routed through mFN 210 where it is converted to optical signals for transmission along optical fiber 115a to CO 110. Lower frequency signals are transmitted through related coaxial amplifier 125 to fiber node 120 for transmission to CO 110 via optical fiber 115. It should be noted that, due to the large bandwidth of high frequency signals, it may not be necessary to retain the use of low frequency signals for upstream traffic except for the purpose of the accommodation of legacy equipment.

The frequency range of signals bypassing a related PRN may be adjusted for each mCN. Thus, for example, it is possible to adjust mCNs 310a,b to bypass frequencies outside of the bandwidth of related respective coaxial amplifiers 125b,c. However, it is also possible to dynamically adjust mCNs 310a,b to bypass frequencies within bandwidth of related coaxial amplifiers 125b,c.

Figure 4:
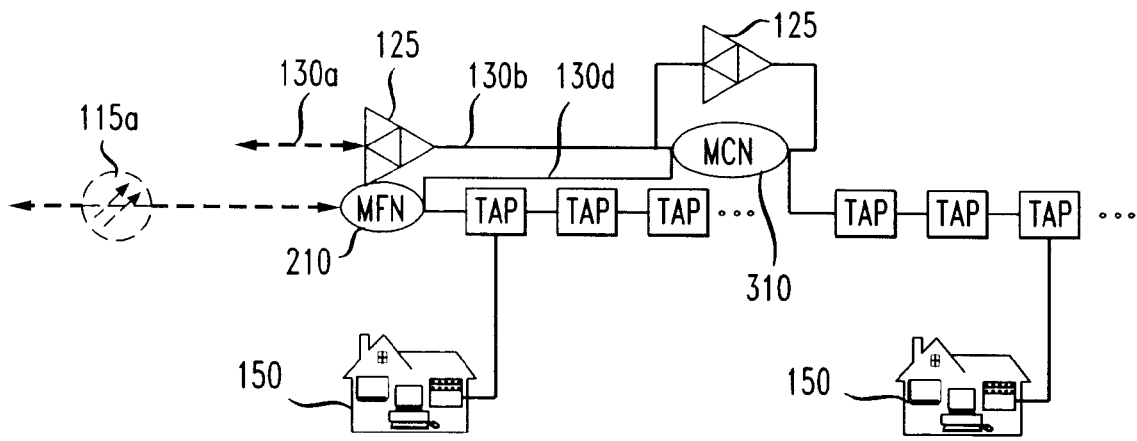
FIG. 4 depicts an alternative embodiment of a bi-directional broadband communications network upgrade utilizing mFN and mini-Coaxial Node technology.

FIG. 4 depicts an alternative embodiment of the present invention utilizing a different topological configuration. In this embodiment, high frequency upstream traffic is transmitted from mFN 210 directly to mCN 310 through coaxial cable 130d comprising a third communication path. This direct configuration provides lower loss transmission of signals by avoiding tap losses along coaxial cable (130b of FIG. 3).

Figure 5:
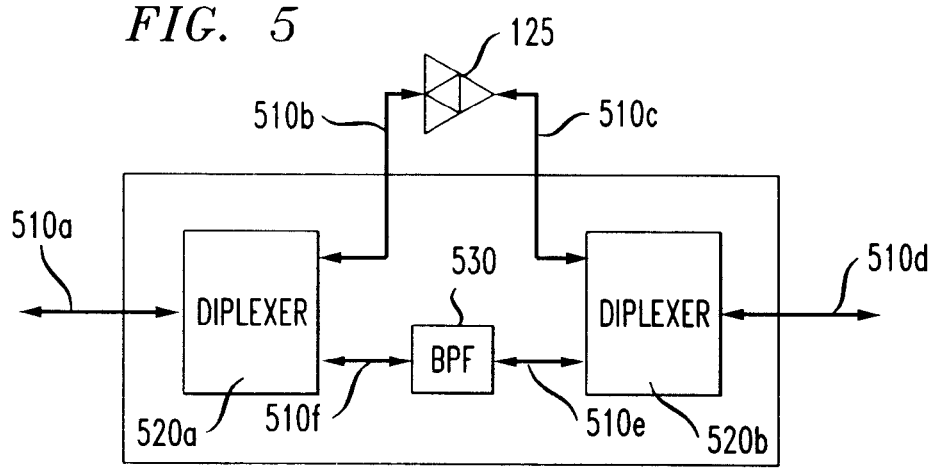
FIG. 5 depicts the architecture of a mini-Coaxial Node according to one embodiment of the present invention.

FIG. 5 depicts the architecture of a mCN in more detail. Traditional services 380 utilizing lower frequency signals are transmitted along the paths 510a, 510b, 510c, 510d. The mCN's function is to pass these existing services transparently. New services 390, usually occupying a higher frequency band than the existing services 380, are transmitted along the path 510a, 510f, 510e, 510d. Diplexers 520a and 520b separate, select and route lower frequency traditional services 380 and higher frequency new services 390. Diplexers 520a and 520b route lower bandwidth signals through coaxial amplifier 125 (primary node) and higher bandwidth signals through band-pass filter (BPF) 530. BPF 530 enhances the selection/filtering to reduce interference and crosstalk. Thus, high-bandwidth signals traversing path 510a, 510f, 510e, 510d are effectively bypassed around coaxial amplifier 125 (primary node). Typically, diplexers 520a, 520b and BPF 530 incorporate a dynamic bandwidth arrangement such that the portion of signals routed through the related primary node and the portion of the signal bypassing the primary node may be altered.

Figure 6:
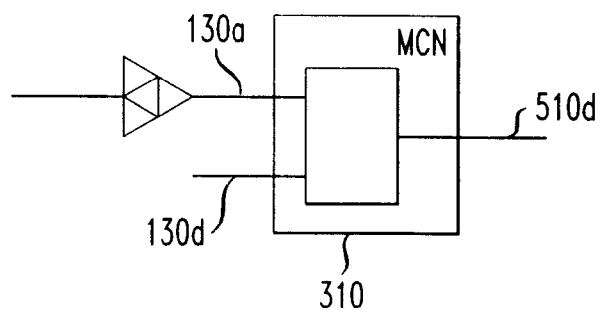
FIG. 6 depicts an alternative architecture of a mini-Coaxial node according to one embodiment of the present invention.

FIG. 6 depicts an alternative embodiment for the configuration of a mCN corresponding to the embodiment depicted in FIG. 4. According to this alternative embodiment, traditional services 380 are routed to mCN 310 through coaxial cable 130a. New services 390 utilizing higher frequency signals arriving from a mFN are also routed directly to mCN 310 through the additional path 130d and are then further routed to users along path 510d.

Although the embodiments discussed herein pertain to the transmission of signals from CO 110 over an optical medium 115, the present invention is compatible with many other transmission media, and the examples discussed herein are merely illustrative and are not intended to limit the scope of the claims appended hereto. The communication paths and segments thereof can be formed from a myriad of transmission media including coaxial cable, optical fiber one or more twisted wire pairs, and wireless transmission. Furthermore different transmission media may be combined throughout a system compatible with the present invention. For example, in another embodiment CO 110 transmits wireless signals to a mini-radio node (mRN), which then further transmits the downstream signals to end units 150 or in the alternative, the downstream signals are sent through a relay mechanism at either an mCN or other mRN downstream of the previous mRN. Likewise, the mRN transmits wireless upstream signals received from end units 150 to CO 110.

Furthermore, although the description has thus far focused on a HFC distribution system, the techniques would also apply to a purely optical distribution system. In this case, for example, the coaxial cable 130 would be replaced by optical fiber, drop taps would be replaced with the appropriate optical couplers, and amplifiers 125 would be replaced with optical amplifiers. All these components are well known in the prior art. Upstream and downstream transmission could be separated using an optical splitter or wavelength multiplexer in place of diplexer 520a,b. In place of the frequency-division multiplexing that was used to combine multiple channels over the coaxial cable, optical wavelength division multiplexing (WDM) would be used.

The present invention is also compatible and may be implemented using other multiplexing schemes such as time-division multiplexing (TDM) rather than FDM. Furthermore, the present invention is compatible with a variety of channel access schemes including time division multiple access (TDMA), frequency division multiple access (FDMA) and code division multiple access (CDMA). In addition, although the embodiments described herein utilize FDM, in an alternative embodiment in order to obtain greater transmission distances, the baseband information bearing signal is transmitted directly from the CO to a mFN. At the mFN, the baseband signal may be modulated with a carrier signal in order to provide transparent operation with downstream mCN's.

The present invention provides a highly flexible, cost-effective and transparent solution for providing bi-directional broadband communications to any existing communications network. Furthermore, the present invention functions in conjunction with existing network architecture, which may have bandwidth limitations imposed by nodes in the system, although the underlying network bandwidth is much higher.

What is claimed is:

1. A communication network for transmitting signals from a central office downstream to a plurality of end unit apparatuses over at least one communication path, the network comprising:

at least two primary nodes allocated along the communication path, and which partition the communication path into multiple segments;

at least one secondary node apparatus that provides at least uni-directional communication between at least two segments of said communication path; and, at least one converter apparatus including communication means for transmitting at least uni-directional communication signals selected from a group including, downstream second signals received directly from the central office over a second communication path sent to at least one end unit apparatus through at least one secondary node apparatus over the said at least one communication path;

upstream signals received from the at least one end unit apparatus and at least one secondary node apparatus over the communication path and sent to the central office over the said second communication path.

2. The communication network of claim 1, wherein downstream second signals received from the central office are also sent directly to at least one end unit apparatus over at least one communication path or distribution path.

3. The communication network of claim 1, wherein the signals are transmitted using frequency division multiplexing.

4. The communication network of claim 1, wherein the signals are transmitted using time division multiplexing.

5. The communication network of claim 1, wherein each secondary node apparatus provides bi-directional communication between at least two segments of the communication path.

6. The communication network of claim 1, wherein each secondary node apparatus selects a portion of the downstream signals to bypass a primary node.

7. The communication network of claim 1, wherein each secondary node apparatus selects a portion of the upstream signals to bypass a primary node.

8. The communication network of claim 1, wherein the downstream second signals received directly from the central office over a second communication path are signals in a frequency band outside the bandwidth of the primary nodes.

9. The communication network of claim 1, wherein the upstream signals from the at least one end unit apparatus and at least one secondary node apparatus are in a frequency band outside the bandwidth of the primary nodes.

10. The communication network of claim 1, wherein the signals transmitted by the converter apparatus are in the frequency band within the bandwidth of the primary nodes.

11. The communications network of claim 1, wherein the converter apparatus includes communications means for transmitting bi-directional communication signals.

12. The communication network of claim 1 wherein the end unit apparatuses could share the same frequency channel being received or transmitted by the same or different modems at the central office using time division multiplexing or by using a different dedicated frequency channel for each end unit apparatus.

13. The communication network of claim 1, wherein the at least one secondary node apparatus is connected directly to the converter apparatus through a third communication path.

14. The communication network of claim 1, wherein said primary nodes are coaxial amplifiers.

15. The communication network of claim 1, wherein the primary nodes include means for transmitting upstream signals over the communication path.

16. The communications network of claim 1 wherein the communication path is formed from one or more path segments selected from a group including coaxial cable, optical fiber, radio link and one or more twisted wire pairs and the second communication path is formed from one or more path segments selected from a group including optical fiber, radio link, coaxial cable and one or more twisted wire pairs.

17. The communications network of claim 1 wherein signals carried over the at least one communication path and the second communication path are optical signals utilizing wavelength-division multiplexing.

18. In a communications network for transmitting signals downstream from a central office to a plurality of end units over at least one first communication path, said at least one first communication path containing at least two primary nodes, which partition said communication path into multiple segments, a method for transmitting bi-directional broadband signals over said communications network comprising the following steps:

deploying at least one secondary node adjacent to a primary node connecting two adjacent segments of said first communication path;

creating at least one second communication path directly from said central office to a converter apparatus, said converter apparatus including communication means for transmitting at least uni-directional communication signals selected from a group including, downstream second signals received directly from the central office over the at least one second communication path and sent to at least one end unit apparatus through at least one secondary node apparatus over the said at least one communication path;

upstream signals received from the at least one end unit apparatus and at least one secondary node apparatus over the communication path and sent to the central office over the said at least one second communication path.

19. The method of claim 18, wherein the at least one secondary node apparatus is connected directly to the converter apparatus through a third communication path.

20. The method of claim 18, wherein downstream second signals received from the central office are also sent directly to at least one end unit apparatus over at least one communication path or distribution path.

21. The method of claim 18, wherein the signals are transmitted using frequency division multiplexing.

22. The method of claim 18, wherein signals are transmitted using time division multiplexing.

23. The method of claim 18, wherein each secondary node apparatus provides bi-directional communication between at least two segments of the at least one first communication path.

24. The method of claim 18, wherein each secondary node apparatus selects a portion of the downstream signals to bypass a primary node.

25. The method of claim 18, wherein each secondary node apparatus selects a portion of the upstream signals to bypass a primary node.

26. The method of claim 18, wherein the downstream second signals received directly from the central office over the at least one second communication path are signals in a frequency band outside the bandwidth of the primary nodes.

27. The method of claim 18, wherein the upstream signals from the at least one end unit apparatus and at least one secondary node apparatus are in a frequency band outside the bandwidth of the primary nodes.

28. The method of claim 18, wherein the signals transmitted by the converter apparatus are in the frequency band within the bandwidth of the primary nodes.

29. The method of claim 18, wherein the converter apparatus includes communications means for transmitting bi-directional communication signals.

30. The method of claim 18, wherein the end unit apparatuses could share the same frequency channel being received or transmitted by the same or different modems at the central office using time division multiplexing or by using a different dedicated frequency channel for each end unit apparatus.

31. The method of claim 18, wherein the at least one secondary node apparatus is connected directly to the converter apparatus through a third communication path.

32. The method of claim 18, wherein said primary nodes are coaxial amplifiers.

33. The method of claim 18, wherein the primary nodes include means for transmitting upstream signals over the communication path.

34. The method of claim 18 wherein the first communication path is formed from one or more path segments selected from a group including coaxial cable, optical fiber, radio link and one or more twisted wire pairs and the second communication path is formed from one or more path segments selected from a group including optical fiber, radio link, coaxial cable and one or more twisted wire pairs.

35. The method of claim 18 wherein signals carried over the at least one first communication path and the second communication path are optical signals utilizing wavelength-division multiplexing.

36. A node apparatus comprising:
   a communications port for receiving downstream signals over a communication path wherein
   a portion of said downstream signals are selected and transmitted through a related primary node spanning two adjacent sections of said communication path, and
   a portion of said downstream signals are selected and transmitted from one adjacent segment of the communication path to another bypassing said related primary node
   a communications port for receiving upstream signals over a communication path wherein
   a portion of said upstream signals are selected and transmitted through said related primary node, and
   a portion of said upstream signals are selected and transmitted from one adjacent segment of the communication path to another bypassing said related primary node
   a filter apparatus for selecting and transmitting upstream and downstream signals for transmission from one segment of the communication path to another bypassing said related primary node.

37. The node apparatus of claim 36, wherein upstream and downstream signals are transmitted using frequency division multiplexing.

38. The node apparatus of claim 36, wherein signals are transmitted using time division multiplexing.

39. The node apparatus of claim 37 further comprising a means for dynamically modifying the frequency range of the upstream and downstream FDM signals that bypass the related primary node and are transmitted through the related primary node.

* * * * *